(12) United States Patent
Dolezal

(10) Patent No.: US 12,536,313 B2
(45) Date of Patent: Jan. 27, 2026

(54) THIN NETWORK-BASED RESOURCE INTEGRATION

(71) Applicant: NCR Voyix Corporation, Atlanta, GA (US)

(72) Inventor: Robert Michael Dolezal, Buford, GA (US)

(73) Assignee: NCR Voyix Corporation, Atlanta, GA (US)

( * ) Notice: Subject to any disclaimer, the term of this patent is extended or adjusted under 35 U.S.C. 154(b) by 208 days.

(21) Appl. No.: 18/081,145

(22) Filed: Dec. 14, 2022

(65) Prior Publication Data
US 2024/0202350 A1    Jun. 20, 2024

(51) Int. Cl.
*G06F 21/62* (2013.01)
(52) U.S. Cl.
CPC ............................ *G06F 21/6218* (2013.01)
(58) Field of Classification Search
CPC ........... G06F 21/62; G06F 21/6209; G06F 21/6218; G06F 21/57; G06F 21/602; G06F 21/604
USPC .................................................. 726/26–27, 2
See application file for complete search history.

(56) References Cited

U.S. PATENT DOCUMENTS

| | | | | |
|---|---|---|---|---|
| 9,935,876 | B2* | 4/2018 | Sonoda | G06F 9/45558 |
| 11,030,281 | B2* | 6/2021 | Duggal | G06F 21/126 |
| 11,282,137 | B2* | 3/2022 | McDonald | G06Q 20/204 |
| 11,669,371 | B2* | 6/2023 | Masek | G06F 9/5077 |
| | | | | 718/104 |
| 11,750,618 | B1* | 9/2023 | Vashisht | H04L 63/1433 |
| | | | | 726/4 |
| 2007/0044151 | A1* | 2/2007 | Whitmore | G06F 21/57 |
| | | | | 726/23 |
| 2007/0198705 | A1* | 8/2007 | Fenton | G06F 9/44536 |
| | | | | 709/224 |
| 2010/0268645 | A1* | 10/2010 | Martino | G06Q 20/405 |
| | | | | 705/44 |
| 2012/0084280 | A1* | 4/2012 | Bouzas | G06Q 50/01 |
| | | | | 707/723 |
| 2013/0191464 | A1* | 7/2013 | Burckart | G06Q 50/01 |
| | | | | 709/206 |
| 2016/0050209 | A1* | 2/2016 | Govande | H04L 63/101 |
| | | | | 726/7 |
| 2017/0043255 | A1* | 2/2017 | Savolainen | H04L 67/10 |
| 2021/0312462 | A1* | 10/2021 | Sun | G06Q 20/105 |
| 2024/0202350 | A1* | 6/2024 | Dolezal | G06F 21/6218 |
| 2024/0403878 | A1* | 12/2024 | McCoy | H04L 9/50 |

* cited by examiner

*Primary Examiner* — Bharat Barot
(74) *Attorney, Agent, or Firm* — Schwegman Lundberg & Woessner, P.A.

(57) ABSTRACT

A legacy resource is virtualized as a virtualized resource defined by features and capabilities set by an individual through a front-end user interface. Access rules are set on the virtualized resource based on the features and capabilities. When an access is requested to the virtualized resource, the corresponding access rules are enforced. Assuming there is no violation in the access rules, virtualized legacy resource services are overlaid on legacy resource services to cause the legacy resource services to perform any needed access operations on the corresponding legacy resource associated with the virtualized resource without changing any workflows processed by the legacy resource services.

14 Claims, 9 Drawing Sheets

THIN NETWORK-BASED RESOURCE INTEGRATION

BACKGROUND

Often innovation is hindered by the underlying data model for a resource. For example, financial accounts are based on a historical model that includes a financial institution's routing number and a customer's corresponding account number. The model has remained stagnant and yet financial institutions have based their operations, infrastructure, and customer services on this model. As a result, accounts are immutable resources with a set of largely universal rules that govern access.

Consumers and businesses may be eager to adopt innovations, but the rate of adoption is gated by the resource custodians and their data models. The chief impediments to adoption are (1) the need for overhauling legacy account infrastructures to support innovations, and (2) the likely uneven pace of adoption of the innovations, because some features are most powerful when broadly supported by various stakeholders—resource custodians, transaction services, etc. —to implement the innovations.

SUMMARY

In various embodiments, methods and a system for thin network-based resource integration are presented. Legacy resource services are enhanced to support custom-defined virtual resource services managed by custom-defined rules processed through a thin network-based service. Individuals, organizations, or businesses define the virtual resources and rules via a front-end interface to the service. The service overlays the virtual resource services on top of the legacy resource services, enforces the rules, and integrates access operations to the virtual resources via backend interfaces to the legacy resource services that control the legacy resources. The virtual resources can be accessed through workflows that directly or indirectly invoke the virtual resources through the service.

DETAILED DESCRIPTION

Because legacy data models for legacy resources drive technological improvements provided via legacy resource services, there has been little innovation in the industry with respect to some types of resources. For example, account resources associated with financial assets have been based on a data model that has been universally enforced throughout the world for 100 years or more. As a result, legacy resource services constrain what innovations can be achieved. The impediments to rapid technology adoption by legacy resource services are mitigated herein and below by leaving the legacy resource services unchanged and unmodified. A thin network-based resource integration service is provided to process a variety of enhanced services that are based on new virtualized resource services.

The virtualized resource services overlay the existing legacy resource services. The thin network-based resource integration service supports features such as new and enhanced resource attributes, resource aliases, pools of resources, multiple resource owners of a single virtualized resource. Access to the virtualized resources is enforced through flexible and user-defined rules. The thin network-based resource integration service provides a front-end interface for defining virtualized resource attributes, aliases, pools of resources, owners, and customized access rules. Backend interfaces of the resource integration service provide linkage to the corresponding legacy resources through legacy resource services.

As used herein a "resource" is a data asset associated with a given party to a transaction and represented in a data model. For example, a resource may be a financial account, social media account, or other service-based account. A "service" is a one or more sets of cooperating executable instructions that perform access operations between two or more parties using one or more resources. A "legacy resource" is an existing data model for which access is obtained through a "legacy resource service." For example, a legacy resource can be a bank account whose access is controlled through application programming interfaces (APIs) and interfaces (e.g., legacy resource services) associated with a credit union (e.g., resource custodian).

A "virtual resource" is one that is overlayed, linked, and based on one or more legacy resources. A virtual resource can include its own independent identifier that is not dependent on, nor does it have to be in the format of the legacy resource(s) on which the virtual resource is based.

A "resource owner" is an individual or an entity (e.g., business) that controls one or more virtual resources and at least one legacy resource. An owner can be any entity such as a consumer, a business, a government agency, and/or a non-profit organization.

Figure 1A:
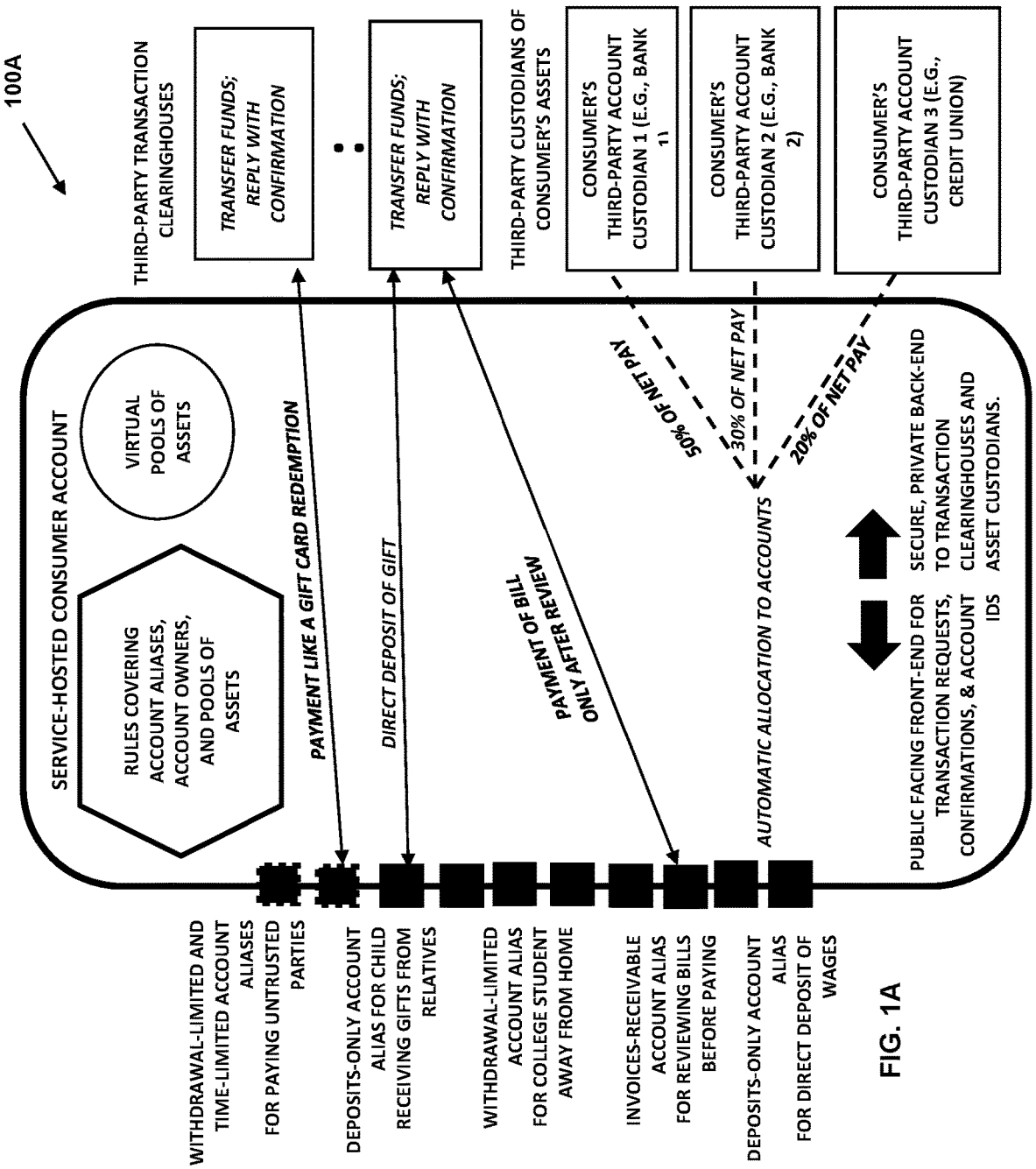
FIG. 1A is a diagram depicting capabilities of a thin network-based resource integration service, according to an example embodiment.

FIG. 1A is a diagram 100A depicting capabilities of a thin network-based resource integration service (shown as thin client resource integration service 113 shown in FIG. 1D discussed below), according to an example embodiment. Service 113 is depicted in FIG. 1A as "Service-Hosted Consumer Account." Consumers define virtual resources and link each virtual resource device to one or more legacy resources. Service 113 maintains a data model for each virtual resource that includes attributes that define aliases (i.e., alternative identifiers) for accessing virtual resources, pools (e.g., types of held assets or currencies for each virtual resource, if any), one or more owners (e.g., the customer is at least one of the owners but can name additional owners), and linkage between a given virtual resource and one or more legacy resources of the customer.

The left side of FIG. 1A illustrates some examples of virtual resources defined by a customer through a user interface or a front-end interface to service 113 by selecting attributes. The selection of pre-defined attributes is linked to access rules; the selected attributes, corresponding rules, and a linkage to a consumer's corresponding legacy resource(s) make up a data model managed by the service 113 for a virtual resource that is selected and custom-defined by a customer. The data model for a given virtual resource is also assigned one or more aliases by service 113. The aliases can be in any format and/or can be in a format typically recognized as a legacy resource, such as a legacy account number format.

The example virtual resources identified on the left side of FIG. 1A include a virtual resource that is identified by an alias associated with restricting account withdrawals by amount and time for paying untrusted parties of a given consumer. Another virtual resource is associated with a deposits-only alias for a child for receiving gifts from relatives by the child. A third virtual resource is associated with a withdrawal-limited alias for a college student away from home. A fourth virtual resource is associated with an invoices-receivable alias for reviewing bills before authorizing payment. Finally, a fifth virtual resource is associated with a deposits-only alias for direct deposit of wages associated with a given consumer.

It is noted that the virtual resources, which are accessible through aliases, can be defined through the front-end interface by a customer selecting attribute types and attribute values, which allows a customer to define an alias or virtual resource by purposes, capabilities, and intent. Thus, the example listed virtual resources and their corresponding alias are presented for purposes of illustration and are not intended to restrict the teachings herein to these specific embodiments.

Service 113 maintains the data models for the virtual resources as aliases, alias resources, or alias accounts along with their corresponding access rules. Each type of virtual resource is accessed via a portal identified as the black squares on the left-hand side of service 113 (e.g., the block entitled "Service-Hosted Consumer Account"). When an access request is made through the corresponding portal using an alias or alias identifier, the rules associated with the type of virtual resource are enforced by service 113. For example, a third-party transaction clearinghouse processes an alias identifier for the deposits-only account of a child; the child is redeeming a gift card into the deposit-only account using a service associated with the gift card provider and the third-party transaction clearing house. Service 113 identifies the virtual resource through the alias provided by the third-party transaction clearinghouse, enforces the deposit-only rules, and credits the alias account with the amount of the gift card redemption. Simultaneously, service 113 causes the funds from the gift card provider's account to be deposited into a legacy checking account of the parent through a backend interface to the parent's bank and the bank's legacy resource service. Logically the child's alias account shows the deposited amount but actually the deposited amount resides in the parent's checking account. This example is similar for the direct deposit of gift example illustrated in FIG. 1A.

As another example, an invoice is sent with an alias that identifies an invoices-receivable alias account of the customer. A front-end or user interface to service 113 permits the customer to review and approve the invoice. Once approved, service 113 uses a backend interface to cause payment to be transferred from the customer's legacy checking account to the payee associated with the invoice using a third-party transaction clearinghouse and at the same time service 113 debits the payment amount from the invoice-receivable alias account (assumes accounting of balance).

In still another example, suppose the customer has signed up for direct deposit with a customer's employer for depositing of the customer's paychecks. The customer provides the requisite direct-deposit form filled out with the alias account associated with direct deposits. The employer transfers a paycheck to the alias account and rules associated with the virtual resource (alias account) are enforced by service 113 causing 50% of the net pay to be deposited to a first legacy account associated with a first bank using a first legacy resource service, 30% of the net pay to be deposited to a second legacy account associated with a second bank using a second legacy resource service, and 20% of the net pay to be deposited to a third legacy account associated with a credit union using a third legacy resource service.

It is noted that the virtual accounts can also be defined based on pools of assets or funds. For example, a customer can have an alias account associated with Euros and another associated with U.S. dollars, funds into and out of an alias account pool correspond to the type of assets associated with the pools. Thus, to save currency-conversion fees, rules would prevent U.S. dollars from being deposited into an alias account denominated in Euros and prevent U.S. dollars from being withdrawn from the Euro-denominated alias account.

Service 113 uses public-facing front-end interfaces for transaction requests, confirmations, and alias account identifiers. Service 113 uses secure private back-end interfaces to interact with legacy resource services associated with transaction clearinghouses and resource custodians (e.g., banks, credit unions, etc.).

Figure 1B:
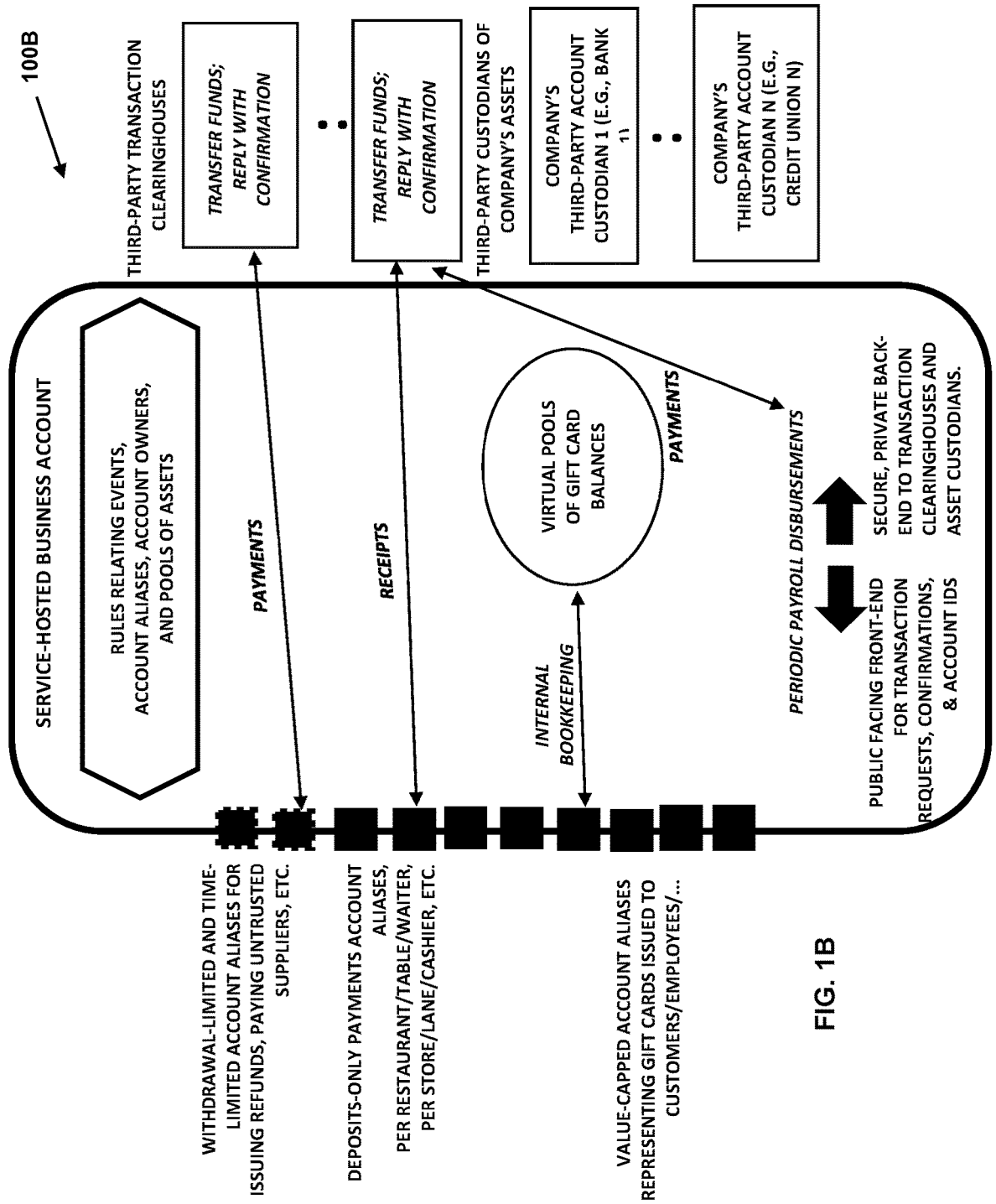
FIG. 1B is a diagram depicting additional capabilities of a thin network-based resource integration service, according to an example embodiment.

FIG. 1B is a diagram 100B depicting additional capabilities of a thin network-based resource integration service 113, according to an example embodiment. FIG. 1A illustrates virtual resources or alias accounts for consumer customers whereas FIG. 1B illustrates virtual resources of alias accounts managed by service 113 for business customers.

Again, the business customer operates a front-end user interface to define alias accounts through selections of predefined attributes that dictate the intent, capabilities, and features of a given alias account. Each type of virtual resource or alias account is also associated with its own set of access rules enforced by service 113 during access attempts made using the alias accounts through portals to service 113. The portals are identified as the black squares on the left-hand side of the box entitled "Service-Hosted Business Account" (e.g., service 113).

FIG. 1B illustrates withdrawal-limited and time-limited account aliases for issuing refunds, paying untrusted suppliers, etc. Also, FIG. 1B illustrates deposits-only payments account aliases per restaurant, per table, per waiter, per store, per checkout lane, per cashier, etc. FIG. 1B also shows value-capped account aliases representing gift cards issued to customers, employees, etc.

Service 113 interacts on a backend with third-party legacy transaction clearinghouses, third-party legacy banks, and third-party legacy credit unions through their existing legacy resource services for purposes of keeping the overall balances of business legacy resource accounts in synch with the balances of the alias accounts managed by service 113. In this way, a given business can have a single virtual pool of gift card balances funded by legacy account resources and balanced on customer and employee bases by service 113 through internal bookkeeping or ledgers.

Service 113 can also perform payroll disbursements to employees of a business utilizing rules to have a third-party transaction clearinghouse transfer the pay from a legacy account resource of the business using a legacy resource service for a bank or credit union directly to other legacy accounts for other banks or credit unions associated with the employees. For example, a business defines multiple alias accounts with different access rules for operations of the business using a single legacy account of the business with a bank or a credit union. The alias accounts can be defined for discretionary expenses, petty cash, employee payroll, individual departments of the business, customers with gift cards or credit cards issued by the business, etc. The payroll checks are issued by rules triggered by service 113 on payday so as to cause the third-party transaction clearinghouse to take funds from the business bank account in the amounts defined per employee and to transfer the corresponding amounts into each employee's bank account. The payroll alias account is debited for the amount of each employee transfer. The business can maintain a single bank account with multiple alias accounts for operations of the business so that at any moment in time the business can see the ledgers and balances associated with each alias account.

Service 113 again includes public front-end interfaces for receiving transaction requests, providing confirmations, and receiving alias account identifiers. Service 113 also includes secure private back-end interfaces to the legacy resource services associated with third-party transaction clearinghouses, banks, and credit unions.

Figure 1C:
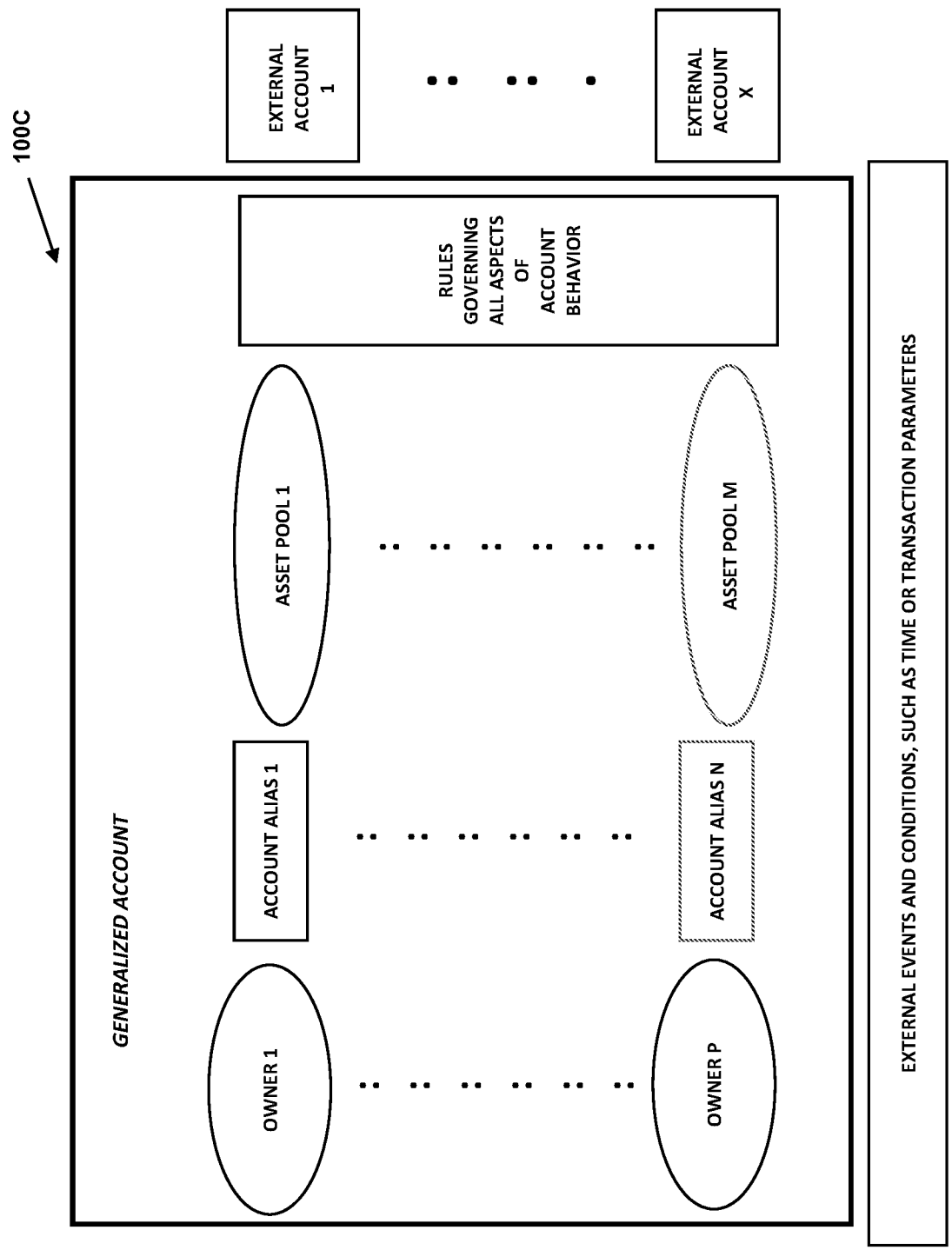
FIG. 1C is a diagram depicting a data model for a resource managed by a thin network-based resource integration service, according to an example embodiment.

FIG. 1C is a diagram of a system 100C depicting a data model for a generalized resource account of an individual with service 113, according to an example embodiment. The data model for the individual's account can include one or more owners of a given virtual resource (i.e., alias account). The registered individual can include 1 to N alias accounts defined and 1 to M virtual asset pools. Each owner, each alias account, and each asset pool has access managed by service 113 through custom-defined rules associated with the purpose, intent, and capabilities of a given virtual resource type. The given virtual resource type is determined by the individual through selection of predefined account attributes during set up or registration with service 113. The generalized account can be linked to one or more external legacy accounts associated with the individual. Service 113 enforces the rules using external events and conditions, such as time and/or transaction parameters for any requested access attempt on the alias accounts.

Figure 1D:
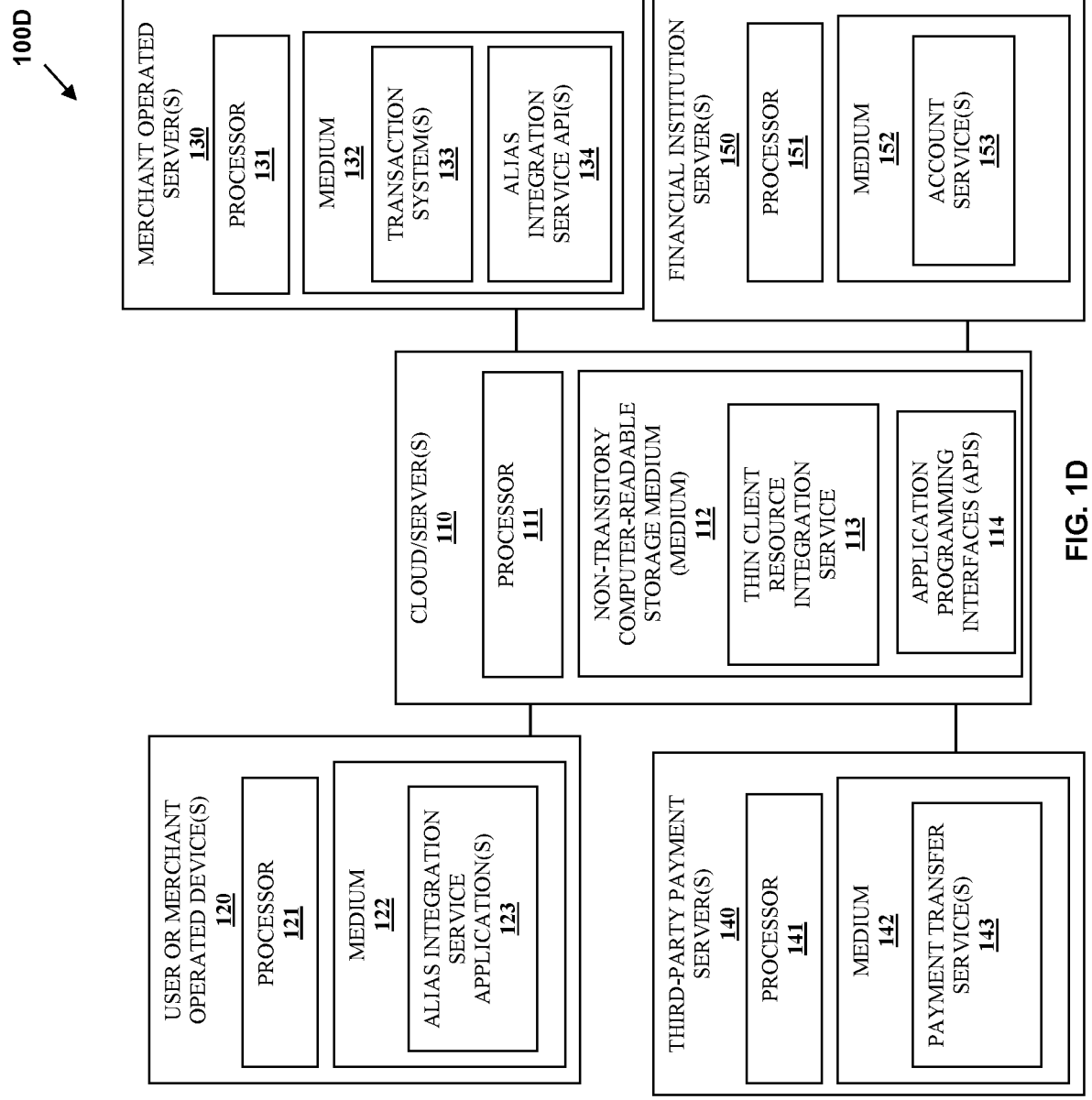
FIG. 1D is a diagram of a system for providing a thin network-based resource integration service, according to an example embodiment.

FIG. 1D is a diagram of a system 100D for providing a thin network-based resource integration service, according to an example embodiment. It is to be noted that the components are shown schematically in greatly simplified form, with only those components relevant to understanding of the embodiments being illustrated. Furthermore, the various components depicted in FIG. 1D and their arrangement is illustrative and not exhaustive. It is to be noted that other arrangements with more or fewer components are possible without departing from the teachings of providing and operating a resource integration service according to embodiments of the disclosed technology.

System 100D provides front-end interfaces to individuals to set up virtual resources of alias accounts for their legacy resource accounts. Virtual resource types selected by the individual during registration through a front-end user interface dictate the available attributes and attribute values that the individual can select for each desired alias account. The virtual resource type, attributes, and attribute values are assigned a set of access rules, which a thin network-based resource integration service enforces during access attempts made to the alias accounts through portals of the service. Backend interfaces are used by the service to interact with legacy resource services to maintain a balance in assets and a synchronization between a sum total of assets in a user's alias accounts with the corresponding user's legacy accounts.

System 100D permits legacy resource services associated with legacy resource accounts to remain unchanged and to utilize existing workflows and infrastructures while expanding the feature function available to the legacy resource accounts through overlayed and linked alias accounts that are custom defined by an individual. Additionally, new workflows are provided that directly or indirectly call system 100D when an account access includes an alias account or alias account identifier. During an alias account access the corresponding rules are enforced, a virtual account balance is updated for the alias account when needed, and the actual assets maintained in the legacy resource account are caused to be updated through the corresponding legacy resource service(s).

System 100D includes at least one cloud/server 110, user-or merchant-operated devices 120, merchant-operated servers 130, third-party payment servers 140, and financial institution (FI) servers 150. Cloud/server 110 includes at least one processor 111 and a non-transitory computer-readable storage medium 112. Medium 112 includes a thin resource integration service 113 and application programming interfaces (APIs) 114, each of which includes executable instructions, that when executed by processor 111, cause processor 111 to perform corresponding operations discussed herein and below with respect to 113 and 114.

Each user or merchant-operated device 120 (hereinafter "party-operated device 120") includes at least one processor 121 and a non-transitory computer-readable storage medium 122. Medium 122 includes a one or more alias integration service applications 123 that include executable instructions which, when executed by processor 121, cause processor 121 to perform corresponding operations discussed herein and below with respect to 123.

Each merchant-operated server 130 includes at least one processor 131 and a non-transitory computer-readable storage medium 132. Medium 132 includes a transaction system 133 and APIs 134, each of which includes executable instructions that, when executed by processor 131, cause processor 131 to perform corresponding operations discussed herein and below with respect to 133 and 134.

Each third-party payment server 140 includes at least one processor 141 and a non-transitory computer-readable storage medium 142. Medium 142 includes a payment transfer service 143, which includes executable instructions that, when executed by processor 141, cause processor 141 to perform corresponding operations discussed herein and below with respect to 143.

Each FI server 150 includes at least one processor 151 and a non-transitory computer-readable storage medium 152. Medium 152 includes an account service 153, which includes executable instructions that, when executed by processor 151, cause processor 151 to perform corresponding operations discussed herein and below with respect to 153.

Initially, an individual, who can be a consumer or a business owner/agent, operates device 120 and a user interface of alias integration service application 123 to register for a generalized account with cloud 110 and thin client resource integration service 113. During registration, the individual (hereinafter individual is referred to as an "account owner") selects user interface options for defining an alias account based on type, selecting attributes for the type, providing, when necessary, attribute values for selected attributes, and linking the alias account being defined during registration of the generalized account to one or more legacy accounts of the account owner.

Service 113 generates an instance of a data model for each registered alias account during the user's registration and assigns access rules that corresponding the virtual resource type, attributes, and attribute values. As discussed above with FIG. 1C, the user can establish multiple different alias accounts and alias pools of assets during registration. Each alias account type assigned a unique portal for receiving access requests; the portal also associated with the access rules. It is noted that the user interface of alias integration service application 123 permits the user to engage service 113 at any point in time following an initial registration session for purposes of adding new alias accounts, deleting alias accounts, or modifying existing alias accounts.

The user interface can also present a history for each alias account showing accesses made (e.g., withdrawals and deposits). Moreover, the user interface can permit the user to transfer funds between alias accounts, assuming the access rules are not violated and assuming the underlying legacy accounts have sufficient funds at the time of the transfer. Furthermore, the user interface can permit the user to perform transfers between generalized accounts from an alias account controlled by the user in a user generalized account to a separate alias account associated with a different user and a different generalized account.

A variety of workflows that utilize a registered user's alias account can be processed using system 100D. For example, suppose that the user is performing an online purchase with a retailer utilizing the retailer's transaction system 133 processed on server 130 while the user operates device 120 and a retailer application or a browser associated with server 130 and transaction system 133. Both the retailer and the user have registered generalized accounts with cloud 110 or service 113. User provides the retailer with an alias account for invoices only. Retailer provides service 113 with a retailer alias account associated with deposits-only along with the invoices-only alias account of the user and the transaction details including transaction price. Service 113 presents the transaction details and price through the user interface of application 123 to the user for approval. When approved by the user, service 113 obtains the legacy account of the user from the linkage to the legacy account in the data model associated with the invoices-only alias account and service 113 obtains the legacy account of the retailer from the linkage to the retailer's legacy account in the data model associated with the deposits-only alias account. Next, service 113 uses an API 114 to securely provide the user's legacy account, the retailer's legacy account, and the transaction amount to a legacy resource service (e.g., payment transfer service 143). Payment transfer service 143 performs the transfer of the transaction amount from the user's legacy account to the retailer's legacy account. Service 113 sends a confirmation back to transaction system 133 through API 134 and sends a confirmation to the user through application 123. Service 113 also updates ledgers and histories associated with the user's invoices-only alias account and the retailer's deposits-only alias account.

In the prior example, service 113 did not have to interact directly with the user's and retailer's account service 153 of their FIs. The interaction with the two account services 153 was performed by the payment transfer service 143 utilized by service 113. Notice also that the workflows associated with a payment transaction on the backend between the third-party payment server and the FI servers 150 was unchanged and was not modified. The legacy workflow was processed while the access transaction for payment by the user was enhanced with additional features and security measures through service 113 because at no point were the user's legacy account and the retailer's legacy account exposed during network communications by or on merchant-operated server and user device 120. Additionally, the custom rules were processed by service 113 such that if any rule was violated the transaction would have failed with transaction system 133.

As another operational example, consider an adult owner of serval legacy accounts, including a legacy checking account and a legacy savings account at a U.S. credit union and a legacy account at a European bank. The adult owner of the accounts registers via application 123 with service 123 to establish a generalized account that includes several alias accounts linked to the legacy accounts. Two new alias accounts are created each with an additional or different account owner from the adult owner, one for a young child living at home and one for a college-age student in a foreign exchange program.

For the young child's alias account attributes set, define U.S. dollars as a virtual pool of assets that can be accessed from the corresponding alias account using a link to the adult's checking account. For the college student abroad, a Euro-denominated virtual pool of assets is linked via rules to the adult's separate account with the European bank. The adult further defines a third account alias that allows deposits but not withdrawals, to receive the adult's bi-weekly wages via direct deposit; access rules to distribute portions of each paycheck to the credit union savings account, the credit union checking account, and to the account at the European bank. The third account alias is not permitted by assigned access rules to be accessed by the young child or the college student). A fourth alias account is defined by the adult that allows withdrawals of up to $50 per month, to pay the young child's allowance (again the fourth alias account is not usable by the older child); the fourth alias account is linked to the adult's checking account. A fifth alias account is defined by the adult that allows withdrawals of up to $2,000 per month, to pay the college student's monthly expenses; the fifth alias account is not usable by the younger child and is linked to the adult's checking account. A sixth alias account is defined by the adult that allows a maximum of $200 per month to be withdrawn, to pay monthly electric bills via direct withdrawal by the utility company, with automatic notification to the account holder by service 113.

Service 113 manages access rules assigned to the six alias accounts to ensure that each access request complies with rules with before service 113 engages legacy resource services (e.g., account services 153 of the credit union and European bank, and any payment transfer services 143). Balances and histories associated with access are maintained by service 113 on behalf of the adult owner and are accessible through the user interface of application 123. Service 113 engages the corresponding legacy resource service for each access request to obtain and transfer funds in accordance with the access requests from the adult's legacy accounts.

Although the above examples were consumer-centric, it is noted that virtualized accounts can also be done for businesses as was described above with FIG. 1B. For example, a business can have alias accounts that are limited in withdrawal amount and time duration for paying suppliers, issuing refunds, or interacting with untrusted entities. The business can have multiple deposits-only alias accounts per restaurant, per table, per waiter, per table, per store, per cashier, per checkout lane or terminal, etc. The business can also have value-capped alias accounts representing gift cards issued to customers, employees, etc. Payroll can also be disbursed to employees via one or more alias accounts.

System 100 can utilize account alias identifiers that are in a same format and same length as is expected by existing payment workflows and networks such that they can be processed to transparently invoke service 113 as a payment entity without modifying the existing payment workflows and without modifying the existing payment networks. This includes payment networks associated with personal checks, credit cards, debit cards, saving accounts, brokerage accounts, etc.

Moreover, system 100 provides a backend linkage to legacy resource services and linkage between generalized accounts associated with alias accounts of two different generalized account owners. In this situation, service 113 identifies the account alias identifiers as being associated with two different generalized accounts and enforces the corresponding access rules for the alias accounts and performs backend legacy resource transfers using the corresponding legacy resource services.

In an embodiment, the legacy resource can include accounts of an individual associated with personal medical data, frequent-flyer miles, shopper reward points, digital coupons, social media data, gaming data, etc. In this way, the legacy resources and the legacy resource services can include more than financial accounts and more than payment networks as was described above.

One now appreciates how system 100D and service 113 provided enhanced virtualized resource services to any account-based resources associated with a user. Front-end interfaces are provided for defining enhanced account alias and assigning access rules to linked legacy account resources of the user. Access requests that utilize an account alias are routed to service 113 and the corresponding access rules are enforced. The accesses are synchronized and balanced with the legacy account resources utilizing backend interfaces to legacy resource services. No changes or modifications are required to existing legacy resource services. The virtualized resource services are overlaid as enhancements on the existing legacy resource services.

Figure 2A:
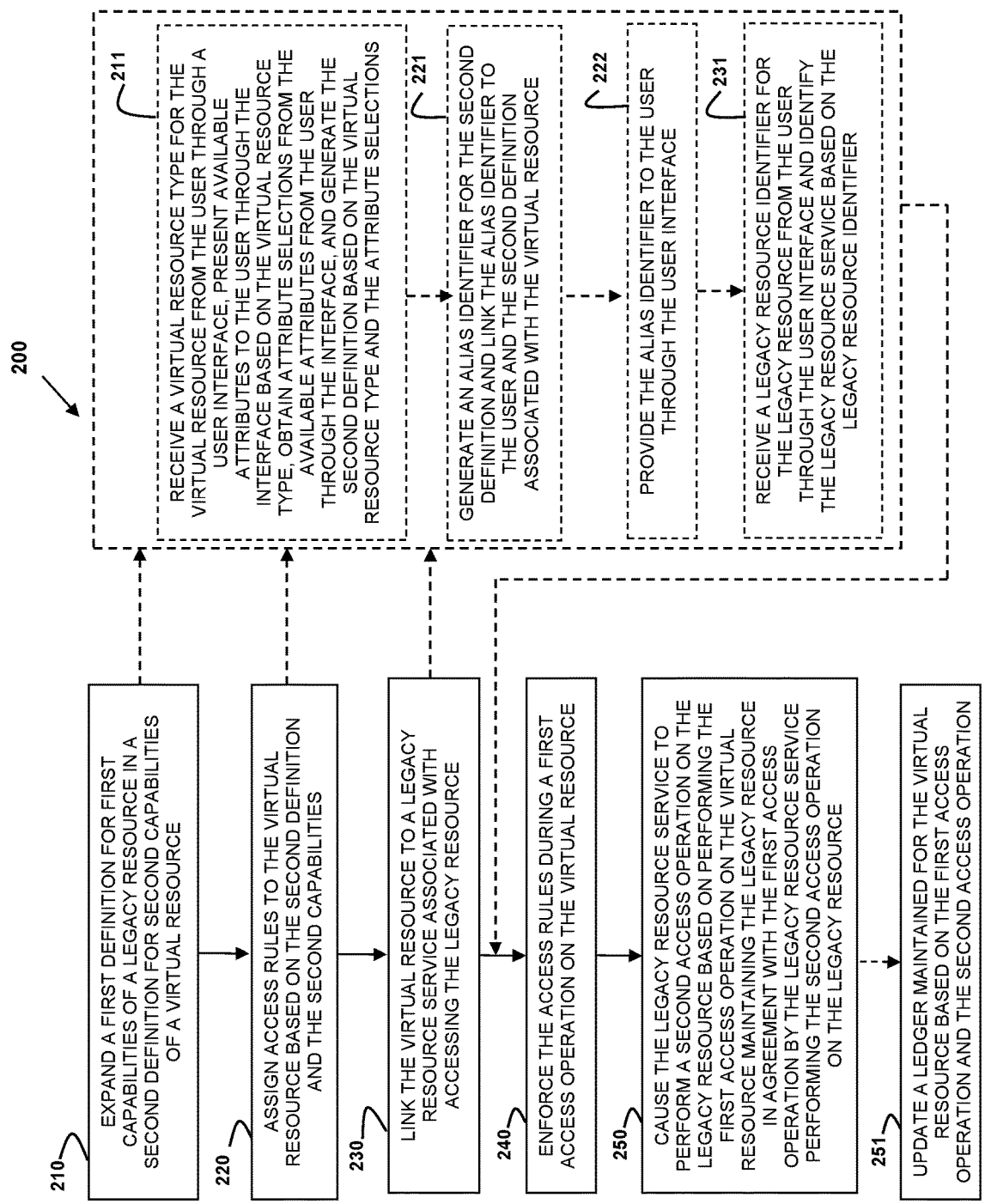
FIG. 2A is a flow diagram of a method for providing and operating a thin network-based resource integration service, according to an example embodiment.
Figure 2B:
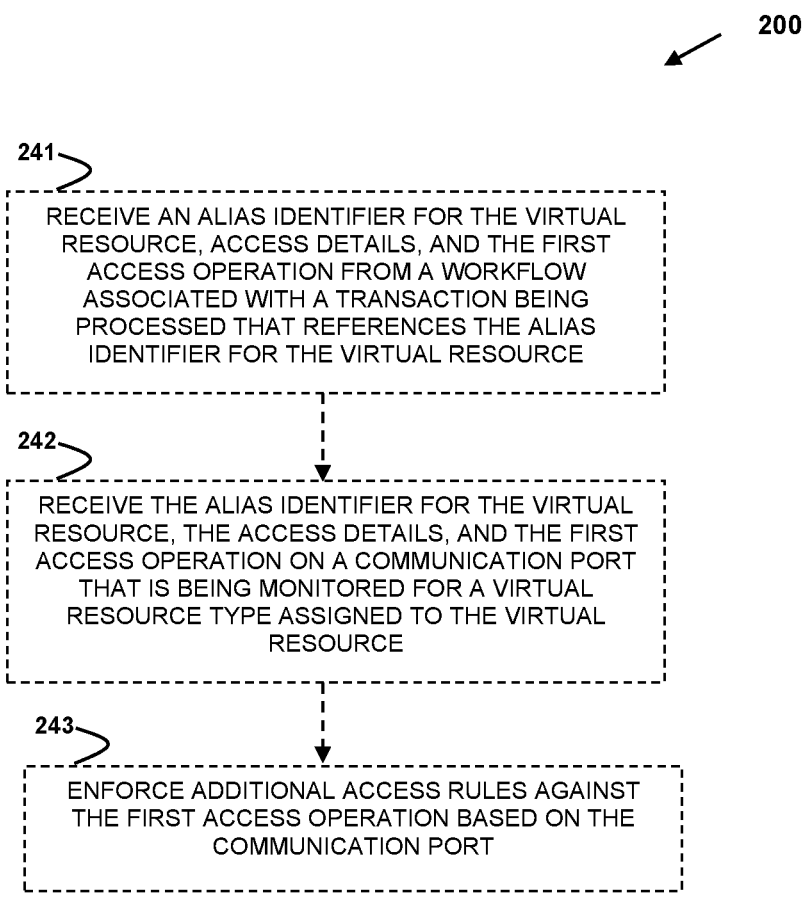
FIG. 2B is a flow diagram of example embodiments of the method of FIG. 2A.
Figure 2C:
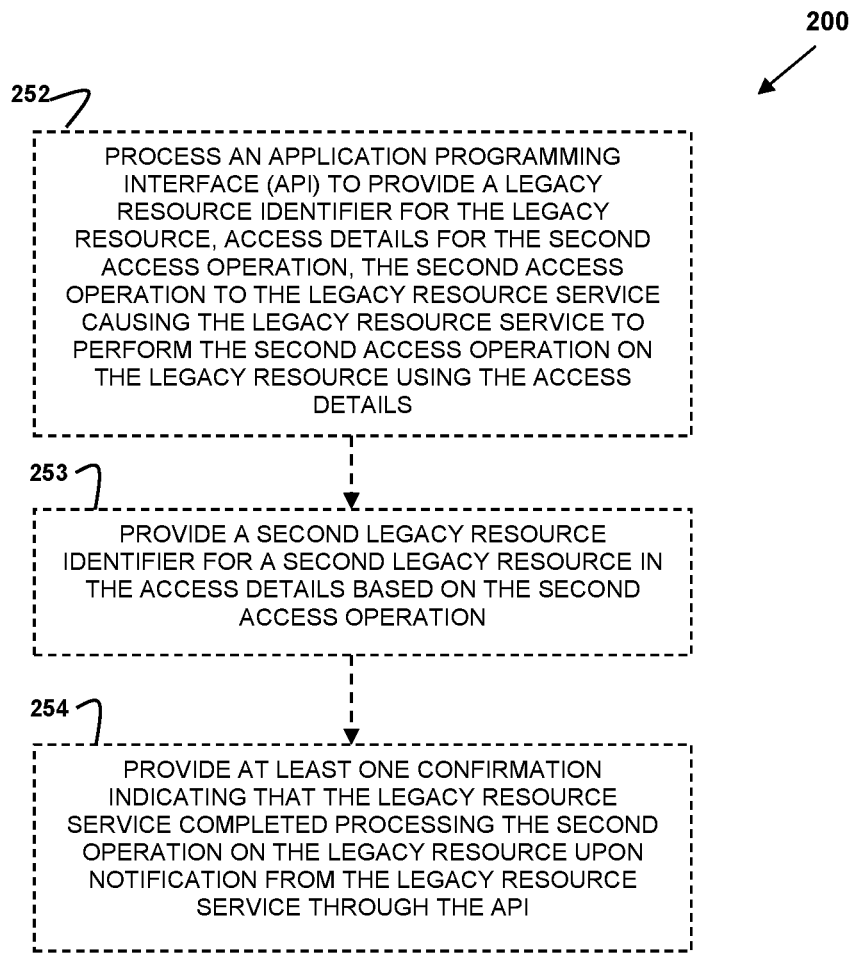
FIG. 2C is a flow diagram of additional example embodiments of the method of FIG. 2A.

The above-discussed embodiments and other embodiments are now discussed with reference to FIGS. 2A-2C and 3A-3B. FIGS. 2A, 2B, and 2C are flow diagrams of a method 200 for providing and operating a thin network-based resource integration service. The software module(s) that implement(s) the method 300 is referred to as a "resource integration service." The resource integration service is implemented as executable instructions programmed and residing within memory and/or a non-transitory computer-readable (processor-readable) storage medium and executed by one or more processors of a device or set of devices. The processor(s) of the device that executes the resource integration service are specifically configured and programmed to process the resource integration service. The resource integration service may have access to one or more network connections during its processing. The network connections can be wired, wireless, or a combination thereof.

In an embodiment, the device that executes the resource integration service is cloud 110. In an embodiment, the device that executes the resource integration service is server 110. In an embodiment, the resource integration service is service 113 and/or APIs 114.

At 210 (shown in FIG. 2A), the resource integration service expands a first definition for first capabilities of a legacy resource in a second definition for second capabilities of a virtual resource. The first capabilities do not include all of the second capabilities. That is, the second capabilities extend capabilities of the legacy resource, which are not available through legacy resource services associated with the legacy resource.

In an embodiment, at 211 (shown in FIG. 2A), the resource integration service receives a virtual resource type for the virtual resource from a user through a user interface. The resource integration service presents available attributes based on the virtual resource type through the interface and obtains attribute selections from the available attributes as selections made by the user through the interface. The resource integration service generates a data model that includes the second definition for the virtual resource based on the virtual resource type and the user's attribute selections.

At 220 (shown in FIG. 2A), the resource integration service assigns access rules to the virtual resource based on the second definition and the second capabilities. The rules can be purpose based, intent based, category based, and/or based on custom defined information included in the second definition.

In an embodiment of 220 and 211, at 221 (shown in FIG. 2A), the resource integration service generates an alias identifier for the second definition and links the alias identifier to the user and the second definition associated with the virtual resource. In an embodiment, the alias identifier is in a same format and of a same length as a conventional account associated with financial accounts, loyalty accounts, social media accounts, service accounts, etc.

In an embodiment of 221, at 222 (shown in FIG. 2A), the resource integration service provides the alias identifier to the user through the user interface. Depending upon registration and profile settings for a registered user, the alias identifier can also be electronically sent via a text message and/or email to the user. Moreover, the alias identifier appears on an account summary page within the user interface for subsequent viewing and inspecting by the user.

At 230 (shown in FIG. 2A), the resource integration service links the virtual resource to a legacy resource service associated with accessing the legacy resource. It is noted that there can be links to multiple legacy resource services such as multiple payment transfer services 143 and multiple account services 153. It is also noted that no changes or modifications are needed by the legacy resource services for the teachings presented herein. Legacy or existing workflows that are processed by legacy or existing resource services are unchanged and unmodified with the teachings presented herein above and below.

In an embodiment of 222 and 230, at 231 (shown in FIG. 2A), the resource integration service receives a legacy resource identifier for the legacy resource from the user through the user interface. The resource integration service identifies one or more legacy resource services to link to the virtual resource based on the user-provided legacy resource identifier.

At 240 (shown in FIG. 2A), the resource integration service enforces the access rules during a first access operation on the virtual resource. That is, each time an access operation includes the virtual resource, the resource integration service enforces the access rules.

In an embodiment, at 241 (shown in FIG. 2B), the resource integration service receives an alias identifier for the virtual resource, access details, and the first access operation from a workflow associated with a transaction being processed that references the alias identifier for the virtual resource. In an embodiment of 241 and at 242 (shown in FIG. 2B), the resource integration service receives the alias identifier for the virtual resource, the access details, and the first access operation on a communication port that is being monitored by the resource integration service for a virtual resource type assigned to the virtual resource. In an embodiment of 242 and at 242 (shown in FIG. 2B), the resource integration service enforces additional access rules against the first access operation based on the communication port.

At 250 (shown in FIG. 2A), the resource integration service causes the legacy resource service to perform a second access operation on the legacy resource based on performing the first operation on the virtual resource. The second operation maintains the legacy resource in agreement or in a balanced state with the first access operation by the legacy resource service performing the second access operation on the legacy resource. For example, if the legacy resource is a bank account with a $100 balance and the first access operation was to transfer $50 from the virtual resource (virtual account) to a second party where the virtual account had a balance of $60, after the first and second access operations are processed the virtual account has a balance of $10 and the bank account has a balance of $50. The virtual account and bank account are in agreement because $50 was transferred from each by the first and second access operations even though the balances of the two accounts differ. Each first access operation is equivalently maintained by the legacy resource service via a second operation.

In an embodiment, at 251 (shown in FIG. 2A), the resource integration service updates a ledger maintained for the virtual resource based on the first access operation and the second access operation. The ledger identifies a history of the first and second access operations as well. The ledger may be accessed through an account summary page in a user interface for viewing by a user.

In an embodiment, at 252 (shown in FIG. 2C), the resource integration service processes an API to provide a legacy resource identifier for the legacy resource, access details for the second access operation, and the second access operation to the legacy resource service. This causes the legacy or existing legacy resource service to perform the second access operation on the legacy resource using the access details. Again, no changes are made or needed to the code and workflow associated with the legacy resource service for the second operation to be processed on the legacy resource as discussed herein and above.

In an embodiment of 252 and at 253 (shown in FIG. 2C), the resource integration service provides a second legacy resource identifier for a second legacy resource in the access details based on the second access operation. This is a case where funds are being transferred between the legacy account associated with the virtual resource and a different second legacy account.

In an embodiment of 253 and at 254 (shown in FIG. 2C), the resource integration service provides at least one confirmation indicating that the legacy resource service completed processing the second access operation on the legacy resource. This occurs when the legacy resource service provides a confirmation notification through the API. Again, the legacy resource service already includes code and a workflow to provide a confirmation once the second access operation is processed on the legacy resource via the API such that this requires no changes to the legacy resource service.

Figure 3A:
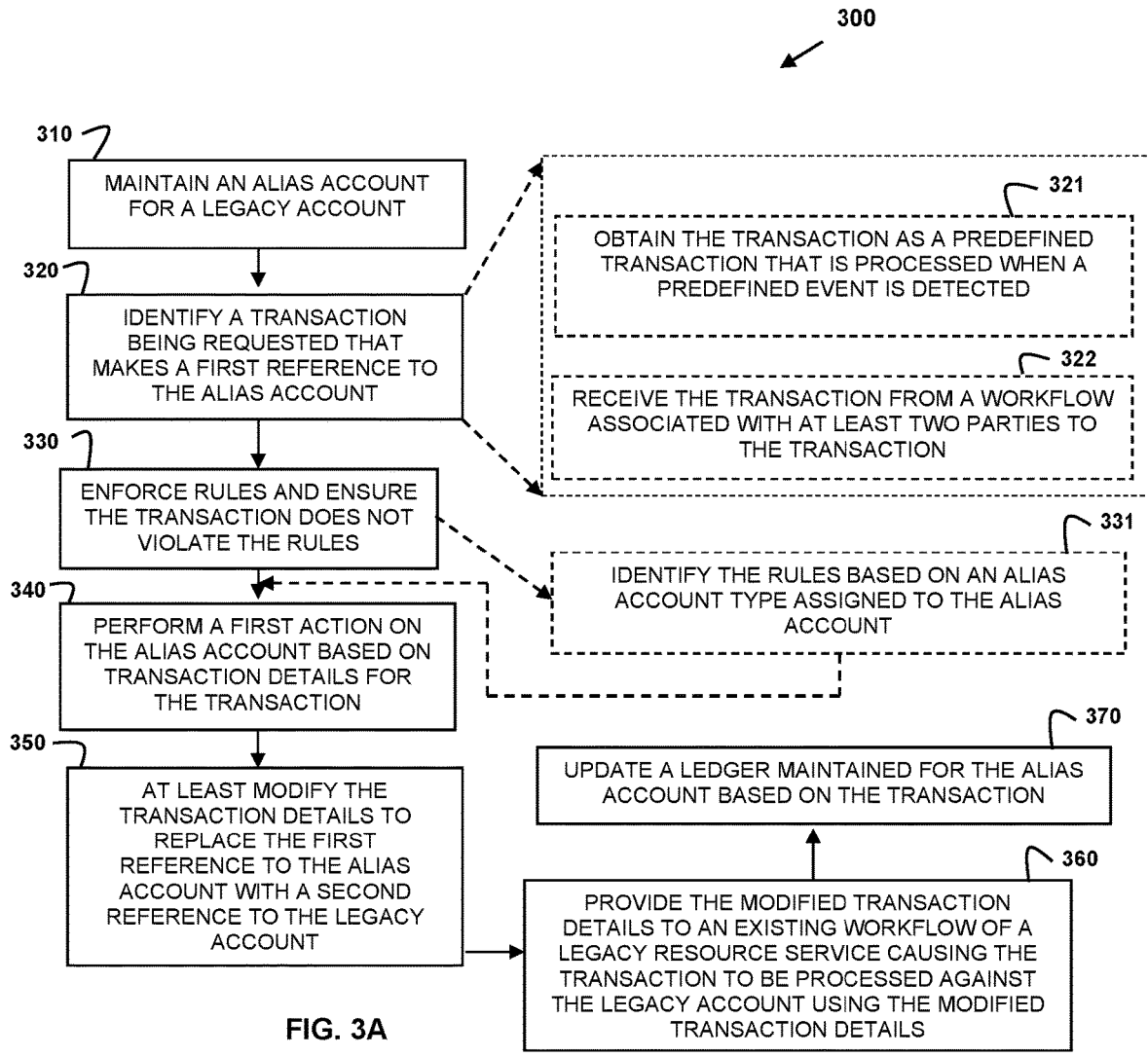
FIG. 3A is a flow diagram of another method for providing and operating a thin network-based resource integration service, according to an example embodiment.
Figure 3B:
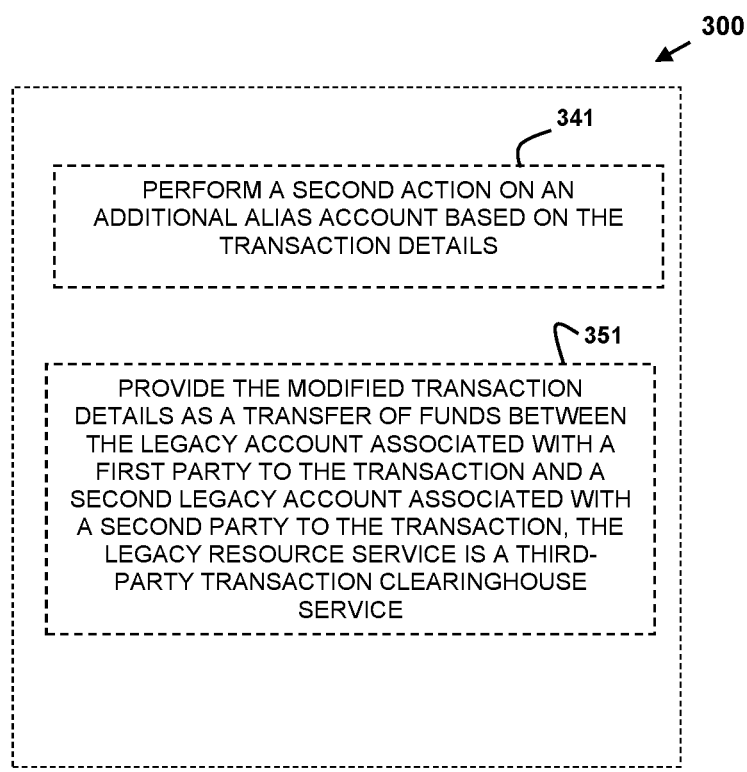
FIG. 3B is a flow diagram of example embodiments of the method of FIG. 3A.

FIGS. 3A and 3B are flow diagrams of another method 300 for providing and operating a thin network-based resource integration service. The software module(s) that implement(s) the method 300 is referred to as a "thin network-based resource integration service." The thin network-based resource integration service is implemented as executable instructions programmed and residing within memory and/or a non-transitory computer-readable (processor-readable) storage medium and executed by one or more processors of a device or set of devices. The processor(s) of the device that executes the thin network-based resource integration service are specifically configured and programmed to process the thin network-based resource integration service. The thin network-based resource integration service may have access to one or more network connections during its processing. The network connections can be wired, wireless, or a combination thereof.

In an embodiment, the device the executes the thin network-based resource integration service is cloud 110. In an embodiment, the device that executes the thin network-based resource integration service is server 110.

In an embodiment, the thin network-based resource integration service is all of, one of, or any combination of 113, 114, and/or the method 200. The thin network-based resource integration service presents another and, in some ways, an enhanced processing perspective from that which was described above with method 200.

At 310 (shown in FIG. 3A), the thin network-based resource integration service maintains an alias account for a legacy account. The alias account is a virtual resource as discussed above with method 200 and the legacy account is a legacy resource as discussed above with method 200.

At 320 (shown in FIG. 3A), the thin network-based resource integration service identifies a transaction being requested that makes a first reference to the alias account. This can be done in a variety of manners.

For example, at 321 (shown in FIG. 3A), the thin network-based resource integration service obtains the transaction as a predefined transaction that is processed when a predefined event is detected. The event can be timing based or transaction circumstance based such as receipt of a direct deposit.

In another example, at 322 (shown in FIG. 3A), the thin network-based resource integration service receives the transaction from a workflow associated with at least two parties to the transaction. For example, a payment transaction from a payer to a payee; a direct deposit from an employer to an employee; etc.

At 330 (shown in FIG. 3A), the thin network-based resource integration service enforces rules and ensures the transaction does not violate the rules. Any transaction violating the rules is denied or declined with a declination message sent to one or more parties to the transaction.

In an embodiment, at 331 (shown in FIG. 3A), the thin network-based resource integration service identifies the rules based on an alias account type assigned to the alias account. That is, the type of alias account can dictate predefined rules or dictate custom-defined changes made by a user owner of the alias account to the predefined rules.

At 340 (shown in FIG. 3A), the thin network-based resource integration service performs a first action on the alias account based on transaction details for the transaction. It is noted that the transaction details may result in a variety of actions being performed on additional alias accounts besides just the alias account as was discussed in the operational examples presented above with system 100D. For example, at 341 (shown in FIG. 3B), the thin network-based resource integration service performs a second action on an additional alias account based on the transaction details.

At 350 (shown in FIG. 3A), the thin network-based resource integration service at least modifies the transaction details to replace the first reference to the alias account with a second reference to the legacy account. The legacy or existing legacy resource service is unaware of and cannot handle the alias account reference since it appears as a non-existent account to the legacy or existing legacy resource. Thus, the thin network-based resource integration service at least replaces the alias account reference with the linked legacy account reference to the legacy account.

In an embodiment, at 351, (shown in FIG. 3B), the thin network-based resource integration service provides the modified transaction details as a transfer of funds between the legacy account associated with a first party to the transaction and a second legacy account associated with a second party to the transaction. The legacy resource service is a third-party transaction clearing house service used for credit and debit transactions.

At 360 (shown in FIG. 3A), the thin network-based resource integration service provides the modified transaction details to an existing workflow of a legacy resource service. This causes the transaction to be processed against the legacy account using the modified transaction details. At 370 (shown in FIG. 3A), the thin network-based resource integration service updates a ledger maintained for the alias account based on the transaction.

It should be appreciated that where software is described herein in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other suitable manner.

Furthermore, although the software modules are illustrated as executing on one piece of hardware, the software may be distributed over multiple processors or in any other suitable manner. The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:
   expanding a first definition for first capabilities of a legacy resource in a second definition for second capabilities of a virtual resource;
   assigning access rules to the virtual resource based on the second definition and the second capabilities;
   linking the virtual resource to a legacy resource service associated with accessing the legacy resource;
   enforcing the access rules during a first access operation on the virtual resource; and
   causing the legacy resource service to perform a second access operation on the legacy resource based on performing the first access operation on the virtual resource maintaining the legacy resource in agreement with the first access operation by the legacy resource service performing the second access operation on the legacy resource, wherein the virtual resource includes an alias identifier that is in a same format and of a same length as a conventional account associated with financial accounts, loyalty accounts, social media accounts, or service accounts;
   wherein the virtual resource is overlayed on the legacy resource and the access rules are custom-defined rules processed through a thin network-based service.

2. The method of claim 1, wherein expanding further includes receiving a virtual resource type from a user through a user interface, presenting available attributes to the user through the user interface based on the virtual resource type, obtaining attribute selections from the available attributes provided by the user through the user interface, and generating the second definition based on the virtual resource type and the attribute selections.

3. The method of claim 2, wherein assigning further includes generating an alias identifier for the second definition and linking the alias identifier to the user and the second definition associated with the virtual resource.

4. The method of claim 3 further comprising, providing the alias identifier to the user through the user interface.

5. The method of claim 4, wherein linking further includes receiving a legacy resource identifier for the legacy resource from the user through the user interface and identifying the legacy resource service based on the legacy resource identifier.

6. The method of claim 1, wherein enforcing further includes receiving an alias identifier for the virtual resource, access details, and the first access operation from a workflow that is associated with a transaction being processed that references the alias identifier for the virtual resource.

7. The method of claim 6, wherein receiving further includes receiving the alias identifier, the access details, and the first access operation on a communication port being monitored for a virtual resource type assigned to the virtual resource.

8. The method of claim 7, wherein enforcing further includes enforcing additional access rules against the first access operation based on the communication port.

9. The method of claim 1, wherein causing further includes:
   processing an application programming interface (API) to provide a legacy identifier for the legacy resource, access details for the second access operation, and the second access operation to the legacy resource service causing the legacy resource service to perform the second access operation on the legacy resource using the access details.

10. The method of claim 9, wherein processing further includes:
providing a second legacy resource identifier for a second legacy resource in the access details based on the second access operation.

11. The method of claim 10 further comprising, providing at least one confirmation that the legacy resource service completed processing the second access operation on the legacy resource upon notification received from the legacy resource service through the API.

12. The method of claim 1, wherein causing further includes updating a ledger maintained for the virtual resource based on the first access operation and the second access operation.

13. A system, comprising:
a server comprising at least one processor and a non-transitory computer-readable storage medium;
the non-transitory computer-readable storage medium comprising server executable instructions;
the server executable instructions, when executed by the at least one processor, cause the at least one processor to perform operations comprising:
providing a front-end interface to define capabilities of at least one virtual resource overlaid on at least one legacy resource;
assigning customized access rules to the at least one virtual resource based on user-defined input provided through the front-end interface;
enforcing the customized access rules during first access operations that reference the at least one virtual resource;
causing a legacy resource service associated with the at least one legacy resource to perform second access operations against the at least one legacy resource based on processing the first access operations against the at least one virtual resource; and
maintaining an updated ledger that balances the first access operations performed on the at least one virtual resource with the second access operations performed on the at least one legacy resource by the legacy resource service, wherein the at least one virtual resource includes an alias identifier that is in a same format and of a same length as a conventional account associated with financial accounts, loyalty accounts, social media accounts, or service accounts;
wherein a virtual resource service overlays the legacy resource service and a thin network-based resource integration service supports enhanced resource attributes, resource aliases, pools of resources, and multiple resource owners of a single virtualized resource.

14. The system of claim 13, wherein the at least one virtual resource includes a single virtual resource and the at least one legacy resource includes two or more legacy resources.

* * * * *